235-381 SR
3/11/86 XR 4,575,719

United States Patent [19] [11] Patent Number: 4,575,719
Bertagna et al. [45] Date of Patent: Mar. 11, 1986

[54] CONTROLLED ACCESS STORAGE SYSTEM

[75] Inventors: Richard A. Bertagna, San Dimas; Dickey J. Berry, Azusa, both of Calif.

[73] Assignee: Avicom International, Inc., Pasadena, Calif.

[21] Appl. No.: 541,987

[22] Filed: Oct. 14, 1983

[51] Int. Cl.[4] .................. H04Q 9/00
[52] U.S. Cl. .................. 340/825.35; 235/381
[58] Field of Search .................. 340/825.55, 825.35, 340/825.34; 194/15, DIG. 5; 235/381-383, 379

[56] References Cited

U.S. PATENT DOCUMENTS

| | | | |
|---|---|---|---|
| 4,267,942 | 5/1981 | Wick, Jr. et al. | 221/2 |
| 4,300,040 | 11/1981 | Gould et al. | 340/825.35 |
| 4,366,481 | 12/1982 | Main et al. | 340/825.55 |
| 4,414,467 | 11/1983 | Gould et al. | 235/381 |
| 4,449,040 | 5/1984 | Matsuoka et al. | 340/825.34 |

*Primary Examiner*—Donald J. Yusko
*Attorney, Agent, or Firm*—Christie, Parker & Hale

[57] ABSTRACT

A controlled access storage system provides for selectively permitting custodial access to valuable items that can be stored in a safe within the system. The system provides an item-removal mode of operation during which a record member is used to gain access to stored valuable items and is captured until an ensuing item-replacement mode of operation.

11 Claims, 18 Drawing Figures

CONTROLLED ACCESS STORAGE SYSTEM

BACKGROUND OF THE INVENTION

This invention relates to apparatus for selectively permitting custodial access to valuable items.

In many situations, the custody of valuable items is entrusted to authorized persons who must be held accountable for the valuable items. One such situation is involved in the airline entertainment field. Many airline carriers show in-flight movies on video projectors and television monitors connected to video cassette recorders. The airline carriers consider it highly desirable to show "first-run" type movies that have not been released in video cassette form for general consumer purchase or leasing. The video cassettes for such "first-run" type movies are extremely valuable and a great temptation exists for pirates to take them, duplicate them, and sell the copies without compensating the copyright owners.

A complicating factor in the foregoing and similar situations involves the relatively large number of people who need to have access to each valuable item to put it to its intended legitimate use. Where any of the numerous persons making up the flight crew and the flight attendant staff have access to these video cassettes, it becomes very difficult to account for the custody of the video cassettes. The perceived unlikelihood of being identified as a pirate increases the temptation to pirate. Also, such perception discourages the licensing of first-run type movies to the airline carriers. Distributors may be discouraged to such an extent as to refuse to provide first-run type movies in video cassette form to an airline carrier at any reasonable price.

In view of the foregoing, it will be appreciated that there exists a substantial need for a practical, easy-to-use, security apparatus for selectively permitting access to such video cassettes or other valuable items in similar situations such as hospitals where drugs are placed in the custody of hospital personnel. It will also be appreciated that a need exists for such security apparatus to incorporate features making it practical to increase individual accountability with respect to custody of such valuable items.

SUMMARY OF THE INVENTION

This invention provides apparatus for selectively permitting custodial access to valuable items. The apparatus comprises a safe having a closure movable between closed and open positions, and having a valuable-item storage region from which and into which valuable items can be removed and replaced while the closure is in its open position. Suitably, the closure is a hinged door; alternatively, other closures such as a sliding drawer or the like can be used. Preferably, the safe includes means defining a plurality of compartments within the storage region, each compartment being configured for containing a separate valuable item such as a video cassette.

The apparatus further includes locking means operable while the closure is in its closed position for selectively locking and unlocking the closure. Suitably, the locking means includes a solenoid-operated deadbolt within an inside portion of the closure.

According to one aspect of the invention, the apparatus includes access-control means including prerecorded data entry means for deriving a first code from a record member, and including a receptacle configured to guide the record member as it is inserted and withdrawn from the receptacle, and reading means for deriving the first code upon insertion of the record member. Suitably, the record member is a plastic card having holes punched in it to define the prerecorded data. The apparatus further includes manually controlled means for inputting a second code. Suitably, a numeric keyboard is provided on a wall of the safe for use in inputting the second code. The apparatus further includes data processing means for controlling predetermined sequences of operation during item-removal and item-replacement modes of operation. Further according to this aspect of the invention, the apparatus includes means selectively operable to capture and release an inserted record member, and the data processing means includes means for causing the capturing means to capture the inserted record member during an item-withdrawal operation and to cause the capturing means to release the record member during an item-replacement operation.

According to another aspect of the present invention, there is provided a fail-safe feature. In terms of structure, the access-control means in the apparatus includes electronic data processing means and means for connecting the electronic data processing means to an electrical power supply. In the preferred embodiment, the electronic data processing means is contained within the safe and a cable is provided as part of the connection to an electrical power source within an aircraft. Further, with respect to the fail-safe feature, the data processing means includes integrated-circuit memory means having a plurality of non-volatile memory locations, and includes means for storing record data into such non-volatile memory locations for each of a series of item-removal and item-replacement operations, each such record being preserved notwithstanding a loss of supply of electrical power.

Further aspects of the invention are described below and defined in the appended claims.

BRIEF DESCRIPTION OF THE DRAWINGS

FIG. 3 comprises FIGS. 3A–3C.

DETAILED DESCRIPTION

With reference to the drawings, the apparatus depicted therein provides for selectively permitting access to valuable items, and embodies preferred features of this invention including features adapting it for the special purpose use where the valuable items are video cassettes to which flight attendants are selectively permitted custodial access to show in-flight movies.

Figure 1:
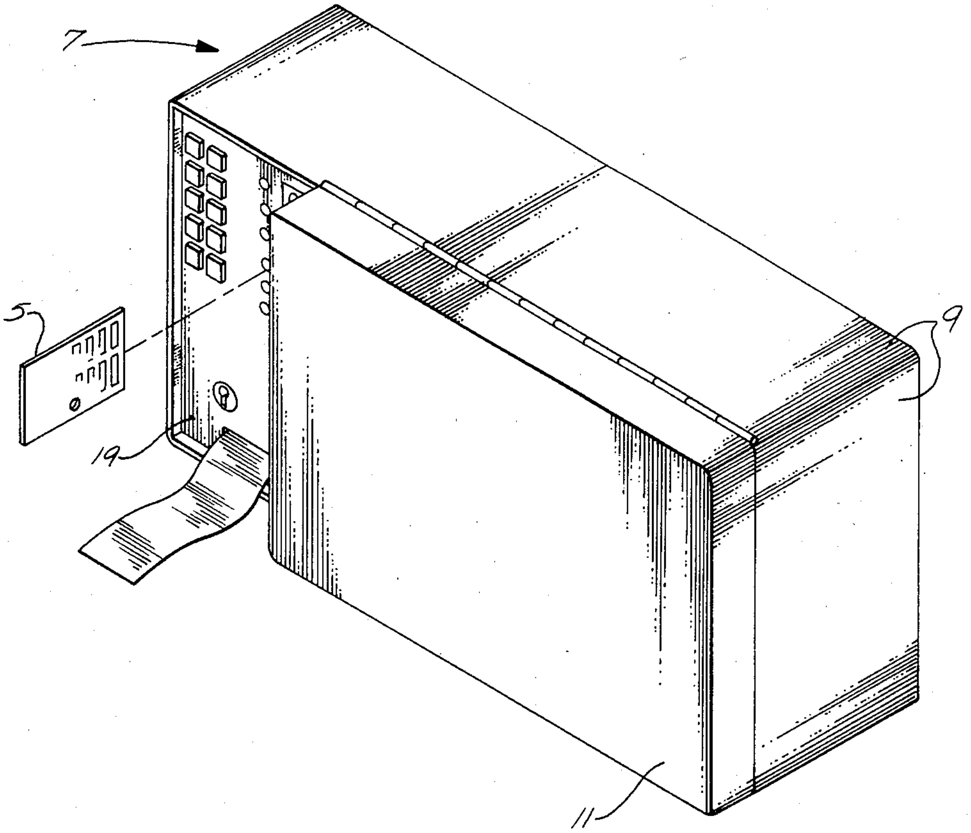
FIG. 1 is a perspective view of the preferred embodiment of the present invention, and shows an external record member used in gaining custodial access to valuable items.
Figure 1A:
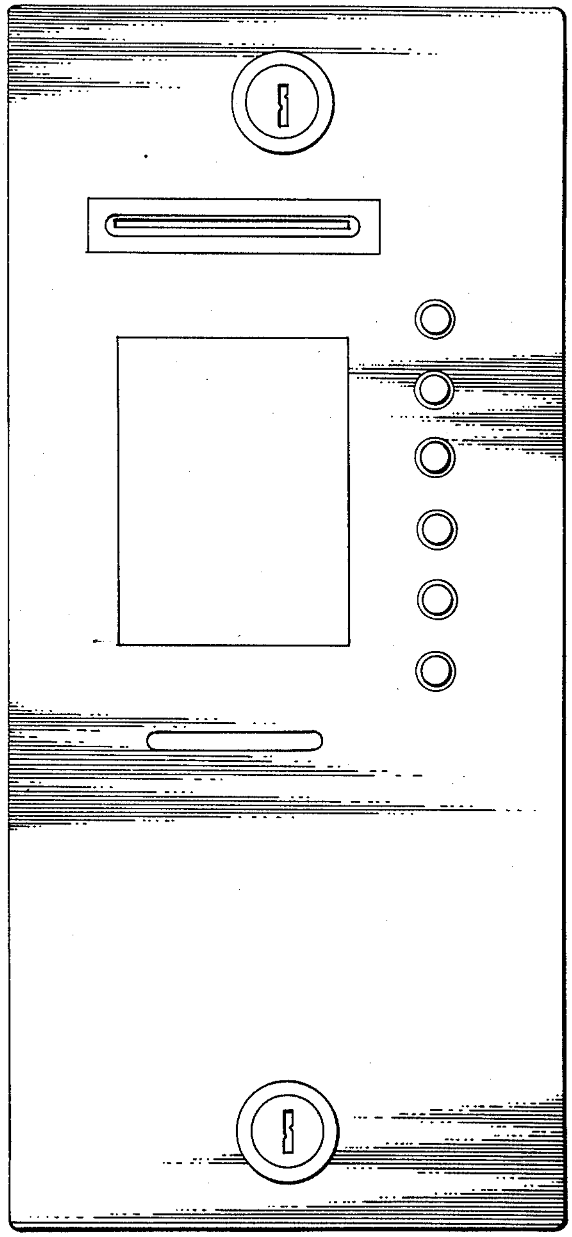
FIG. 1A is an elevation view of an alternative arrangement for panel 19 of FIG. 1.

In accord with this invention, the apparatus has numerous security features to safeguard the valuable items. One such feature is that a person needs to possess and know how to use a record member to gain access to the valuable items. As depicted in FIG. 1, the record member is a plastic card 5 which is similar in shape and size to a conventional credit card. For use with the preferred embodiment of this invention, the card 5 has holes punched in it to define a first code. In use, each of a number of persons such as airline carrier flight attendants is individually assigned a respective such card, and each such card is uniquely coded. A flight attendant uses the card in the manner of a key as described more fully below.

A safe generally indicated at 7 has sheet metal walls 9 that preferably are fabricated from relatively thick stainless steel so as to be very sturdy. A closure 11 is also made from sturdy metal such as stainless steel and in the preferred embodiment forms a hinged door. FIG. 1 shows the closure 11 in its closed position and FIG. 2 shows it in an open position.

Figure 2:
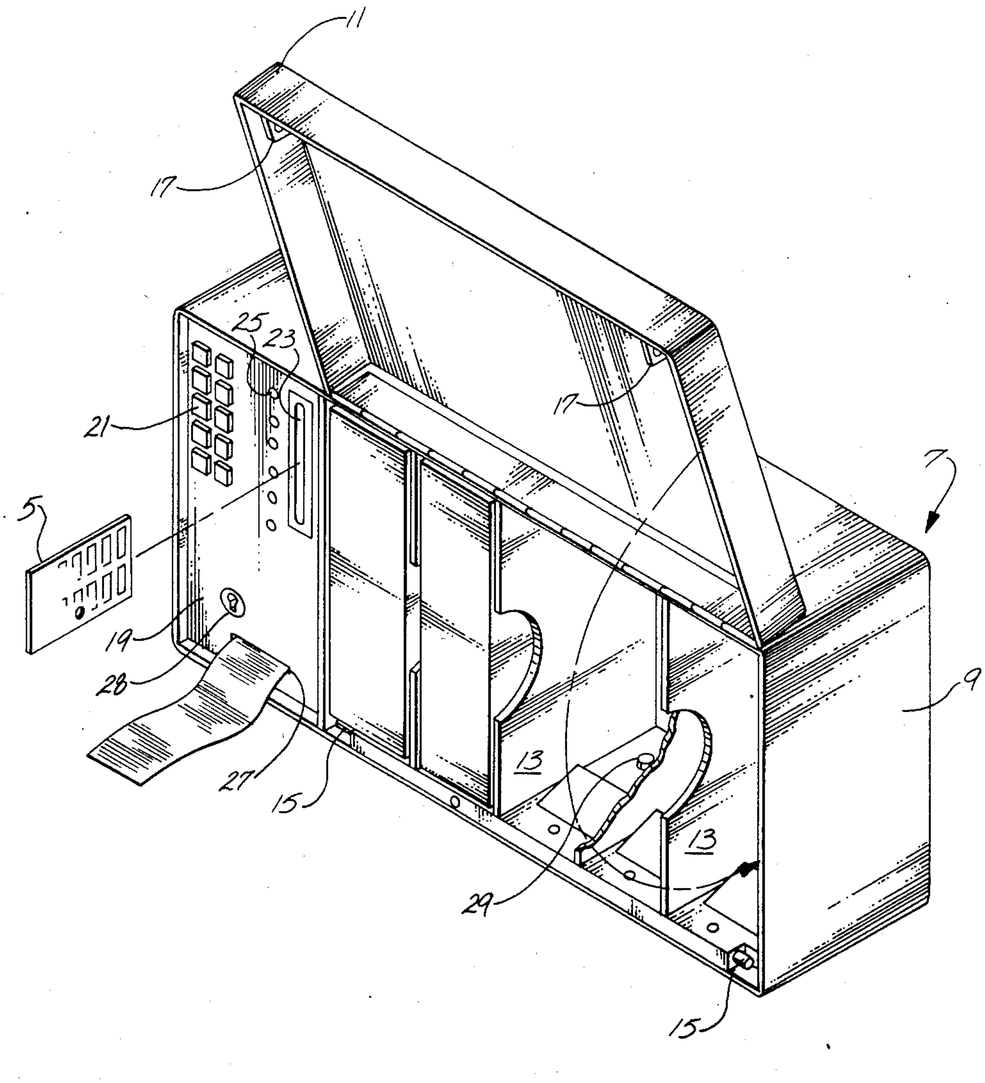
FIG. 2 is a perspective view similar to FIG. 1, with a hinged door shown in an open position to expose an interior valuable-item storage region.

As shown in FIG. 2, the safe has a valuable-item storage region behind the closure. A plurality of divider walls 13 form means for defining a plurality of compartments within the storage region, and each compartment defines a slot appropriately sized and shaped to facilitate sliding a conventional video cassette into and out of the slot.

The safe 7 further includes locking means operable while the closure is in its closed position for selectively locking and unlocking the closure. In the preferred embodiment, the locking means includes a pair of solenoid-actuated deadbolts 15 which, as shown in FIG. 2, are aligned with each other and located in the front-bottom portion of the storage region. To lock the closure, each deadbolt is caused to slide into an opening in a lock member 17 welded to the inside facing surface of the closure 11.

The front face of the safe 7 includes a control panel 19 that supports a numeric keyboard 21 and that has a mouth 23 configured so that the card 5 can manually be inserted into and withdrawn from a receptacle behind the mouth 23. The control panel 19 also supports six light emitting diodes (LEDs) generally indicated at 25 that form indicating means for prompting manual control steps. The control panel 19 also has an opening 27 through which paper is fed out to provide a printed record concerning item-removal and item-replacement operations. A conventional key-operated lock 28 on control panel 19 is provided for use in connection with service accesses described more fully below.

During such a service access, the front panel 19 can be removed to gain access to circuitry and other equipment contained in the safe behind the control panel. If need be, the entire safe can be removed from the aircraft for servicing. Normally, the safe is securely affixed to the aircraft by mounting means including nuts 29 that are accessible only while the closure 11 is open.

Figure 3B:
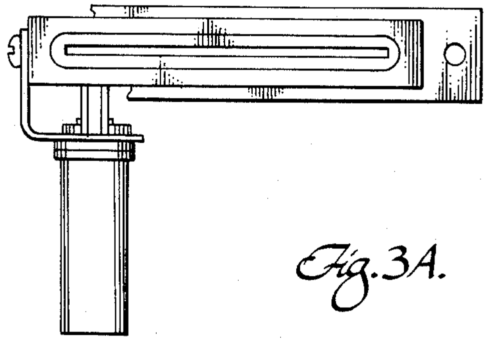
FIGS. 3B and 3C are side elevation views showing additional details.
Figure 3A:
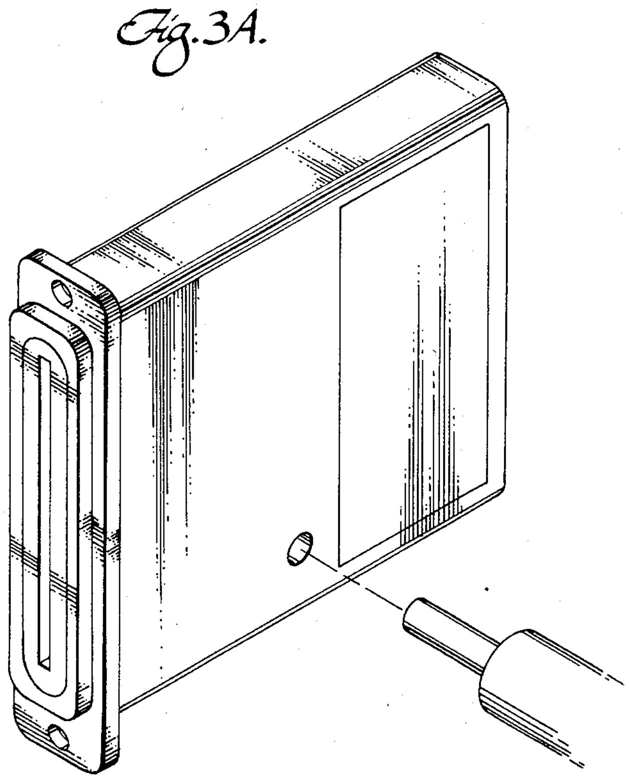
FIG. 3A is a perspective view of a conventional card reader that has been modified for use in the apparatus of this invention to provide for capturing an inserted card.
Figure 3C:
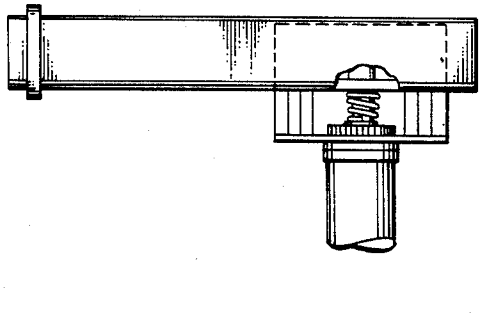
Figure 4:
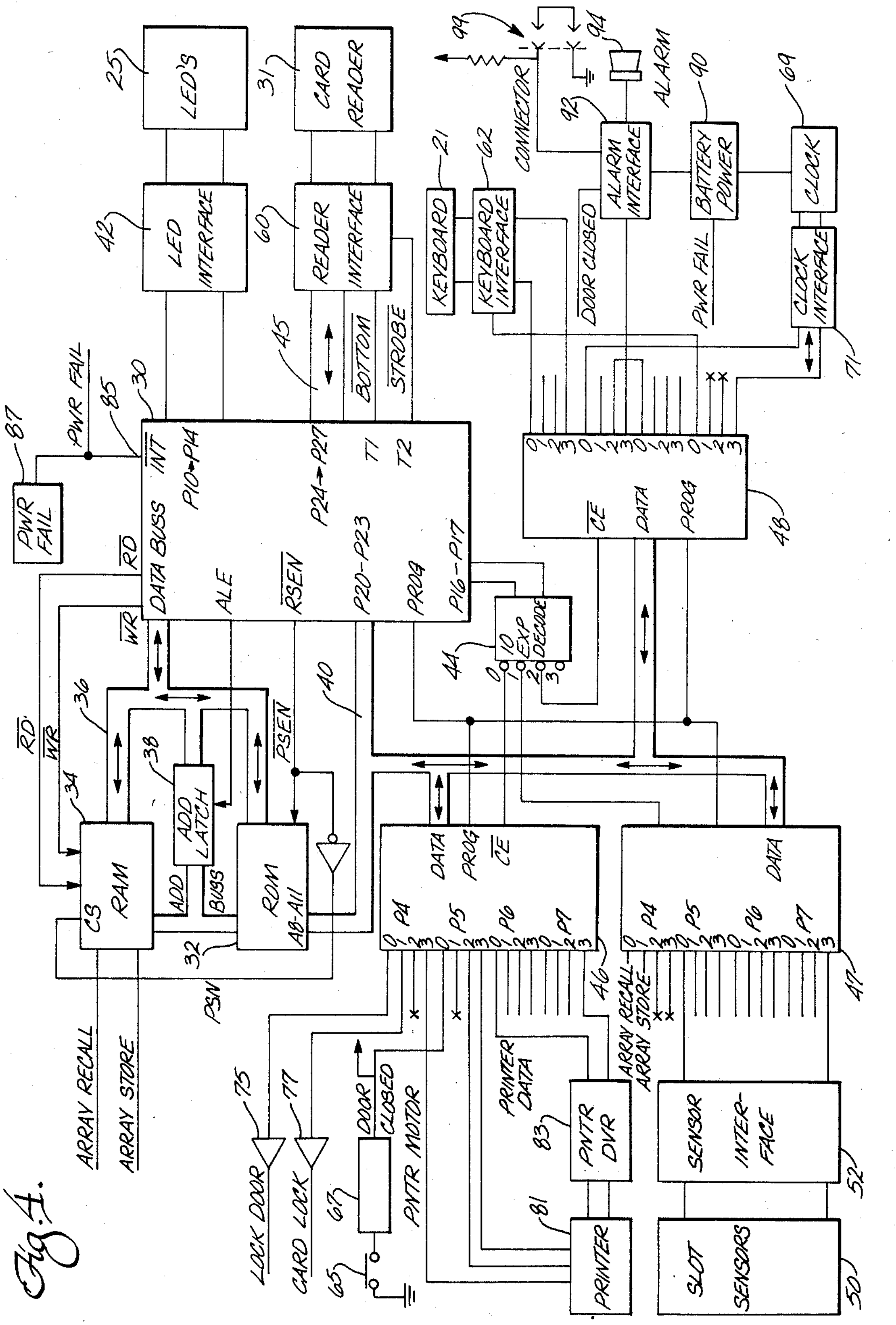
FIG. 4 is a block and schematic diagram of circuitry used in the preferred embodiment of the invention.

In accord with this invention, the apparatus includes data processing means. Briefly, the data processing means is organized to control predetermined sequences of operation during item-removal and item-replacement modes of operation. In the preferred embodiment, the data processing means includes an integrated-circuit microprocessor 30 (FIG. 4). In use of the preferred embodiment, a flight attendant inserts a card into the receptacle, then keys in a personal identification number (PIN). A card reader 31 (FIG. 3) forms means for deriving a first code from the inserted card. The keyboard 21 forms part of a manually controlled means for inputting a second code such as the PIN.

With reference to FIG. 4, the data processing means includes means for detecting a predetermined relationship between such first and second codes. To this end, the microprocessor 30 is controlled in accordance with a program stored in a read only memory (ROM) 32. A suitable microprocessor is manufactured and sold by Nippon Electric Company as part number NEC 80C39. Any of numerous commercially available integrated circuit microprocessors is equally suitable for use in the preferred embodiment.

The microprocessor has numerous terminals for effecting a connection to various other circuits that communicate with the microprocessor. The ROM 32 and a random access memory (RAM) 34 each communicate with the microprocessor via a bus 36. The microprocessor provides an ALE (an acronym for Address Latch Enable) signal that is involved in controlling sequential operations involving bus 36. An address latch circuit 38 responds to the ALE signal to store an addressing signal carried by the bus 36, and to apply the stored address to the RAM and the ROM while data or an instruction is communicated via the bus 36. The addressing signal carried by bus 36 is concatenated with a page address signal carried by a bus 40, to define an absolute address for the ROM.

According to a highly advantageous feature, the RAM 34 is an integrated circuit having a plurality of non-volatile memory locations. A suitable circuit for use in the RAM 34 is manufactured and sold by Xicor, Inc., as part number X2212, which is as a 256×4 bit static RAM. To provide for storing up to 256 bytes, each having 8 bits, the RAM 34 includes two such integrated circuits connected in parallel.

The microprocessor 30 has two ports each providing for communicating 8 bits in parallel. As for one of the ports, six of the parallel bits are used to control the LEDs 25, which are coupled to the microprocessor by a conventional LED interface 42. The remaining 2 bits of this port are applied to a demultiplexer 44.

As for the other port, four of the parallel bits are applied to the bus 40, and the other four are applied to a bus 45.

A suitable demultiplexer is a conventional integrated circuit numerous companies sell as part number 74HC139. The demultiplexer 44 is coupled to the chip enable (CE) input of three conventional I/O expanders 46, 47, and 48. Each of these expanders is connected to the bus 40, and to a PROG terminal of the microprocessor. In operation, the demultiplexer 44 responds to the above-mentioned 2 bits to enable one of the three expanders, and the enabled one communicates with the microprocessor 30 via bus 40 in a manner determined by the signal the microprocessor generates at the PROG terminal.

Under the control of signals defined by the microprocessor 30, the expanders couple data to the microprocessor 30 and couple control signals from the microprocessor to other circuits.

Among the sources of data supplied to the microprocessor 30, there are a plurality of slot sensors 50 and a sensor interface 52. The slot sensors form sensing means for supplying compartment-condition data to report which of the compartments contains a video cassette. Numerous types of sensors can be used. Preferably, the sensors are inconspicuous for security reasons. To this end, in the preferred embodiment, each compartment within the storage region has an infra-red (IR) sensor that radiates IR and detects incident IR. Thus, while a video cassette is within a particular compartment, a signal so indicating is available for inputting into the microprocessor 30 because the video cassette returns IR to the compartment sensor. A suitable alternative arrangement involves use of a bar code reader in a compartment and bar coded indicia on the cassettes. Such an arrangement enables the inputting of information to the microprocessor from the bar code reader to identify the individual cassettes.

Other data that is made available for inputting to the microprocessor 30 include prerecorded data derived from an inserted record member and manually inputted data from the keyboard. To this end, the card reader 31 is coupled to the microprocessor 30 through a keyboard interface 62, the expander 48, and the bus 40.

The reader interface also applies signals to report data as to the position of the record member in the receptacle. The microprocessor 30 has two terminals (T1 and T2) that are additional I/O inputs and which, as used in this apparatus, provide a useful interface for the record member position data.

Other data that is made available for inputting to the microprocessor 30 include closure-condition data and clock/calendar data. The closure-condition data is determined by a closure switch 65. Various types of switches are suitable for use in the apparatus of this invention. In the preferred embodiment, the switch is an IR sensor like the sensors used to provide the compartment-condition data. A conventional buffer circuit 67 is used to provide a digital signal in accord with the switch 65, and this digital signal is coupled through the expander 46 for inputting into the microprocessor 30. The clock/calendar data is determined by a conventional real-time clock calendar circuit 69 that preferably keeps track of Greenwich mean time. A conventional interface circuit 71 couples the clock/calendar 69 to the expander 48 for inputting the data into the microprocessor 30.

As is conventional with microprocessors, the microprocessor 30 can supply output signals via its ports. In the preferred embodiment, such output signals are provided to control various sequences of operations, including operations that occur during item-removal and item-replacement operations. For example, the microprocessor controls the locking means and also a capturing means used in accord with one aspect of this invention.

A conventional driver circuit 75 provides for driving the solenoids used to move the deadbolts 15 (FIG. 2) between locking and unlocking positions. A conventional driver circuit 77 provides for driving a solenoid used to move a capturing rod 78 (FIG. 3) between retain and release positions.

To provide a print out of records stored in the RAM 34, a conventional printer 81 is included in the apparatus. A suitable printer is the kind of small thermal printer commonly used in hand-held electronic calculators. A conventional printer driver circuit 83 applies characterdata signals to the printer in response to such characterdata signals being supplied by the microprocessor 30 via expander 46. The printer motor control, etc., is likewise controlled by the microprocessor 30.

According to one aspect of the invention, the apparatus has a fail-safe feature. In terms of structure the microprocessor 30 has an input terminal 85 and responds to a power fail signal applied thereto by interrupting the execution of its normal program to generate a "footprint" and store that footprint into the non-volatile memory locations of the RAM 34. Such storage of the footprint provides an identification of a return point where execution should resume when power is again applied to the apparatus. The power fail (i.e., interrupt) signal is generated by a conventional threshold-sensing circuit 87 that detects a drop in supply voltage below the predetermined value. The rate at which the supply voltage drops during a power failure is such that the microprocessor 30, operating as it does at a very high pulse repetition frequency, has ample time to generate and store the footprint before the supply voltage drops to such a low value that the microprocessor cannot operate. As part of its response to its interrupt signal, the microprocessor outputs an array store signal that is coupled to the RAM 34 via expander 47. The RAM 34 responds to the array store signal by causing its non-volatile memory locations to contain a copy of the data then stored in the volatile memory locations.

The power fail signal is also used to cause an internal battery 90 to provide power to an alarm interface 92 that in turn supplies an audio signal to an alarm loud speaker, so as to alert attendants to the power fail condition. A further preferred feature of the apparatus involves the selective sounding of an alarm if the apparatus is disconnected from its external source of power. As explained further below, there is a mode of operation provided for servicing of the apparatus and during that mode no such alarm will be sounded when the safe is disconnected from the lock power supply. If, however, a thief attempts to take the entire safe and disconnect the power connector, an open circuit will result at the point indicated at 99. The alarm interface 92 responds to such open circuit to cause the loud speaker 94 to sound an alarm.

With reference to the flow charts shown in FIGS. 5A through 5K, there will now be described the various sequences of operation involved in use and servicing.

Figure 5A:
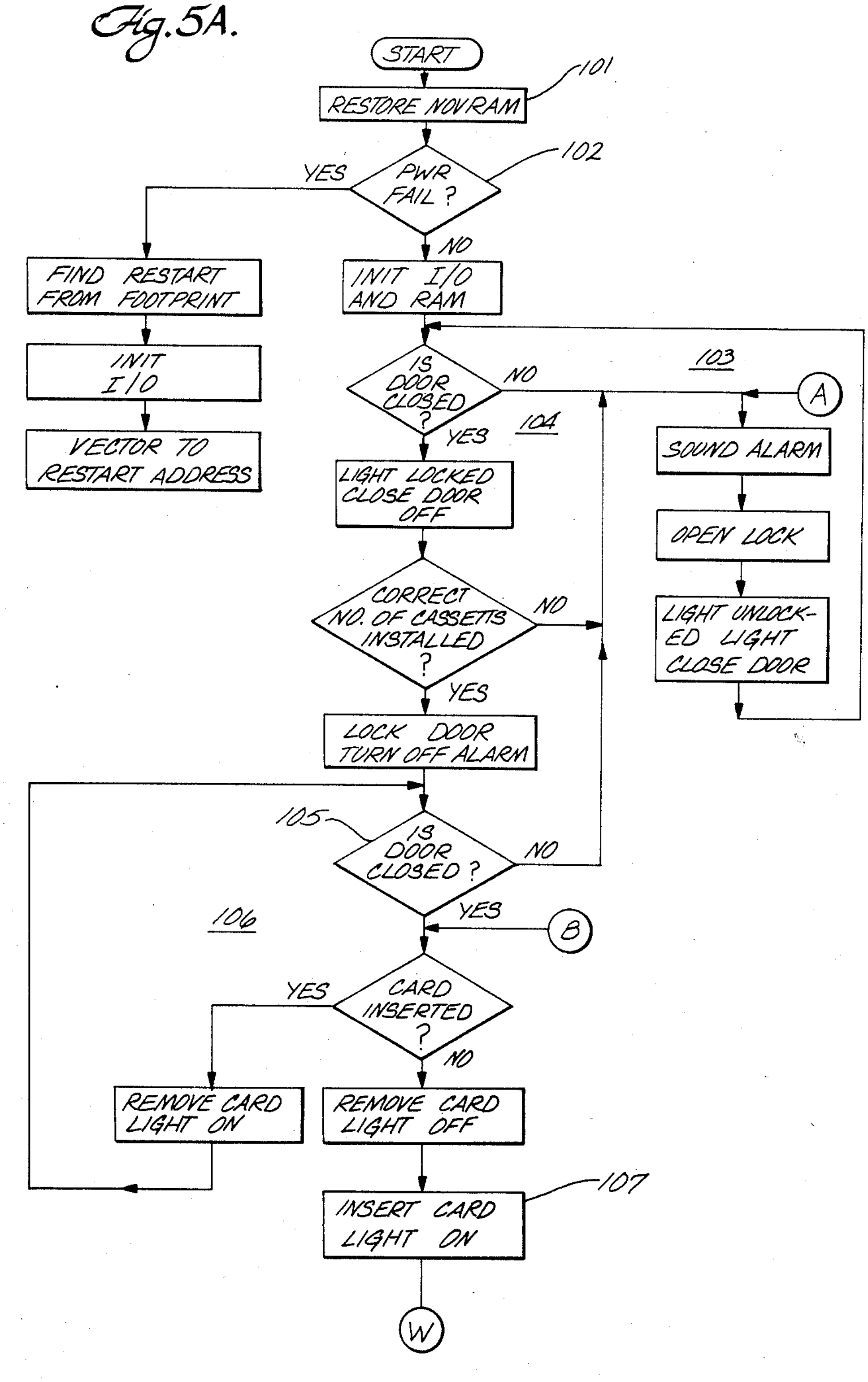
FIG. 5 comprises FIGS. 5A–5K, and is a flow chart showing sequences of operation carried out in accordance with the present invention.

The flow chart of FIG. 5A is primarily directed to an initialization routine. At the start, i.e., when power is applied to the apparatus from an external source, the microprocessor needs to determine whether there had been an earlier power failure. To this end the microprocessor supplies a signal at one of its ports to command the RAM 34 to copy the contents of its non-volatile memory locations into its volatile memory locations. This is represented in the flow chart of FIG. 5A by a block 101 labeled RESTORE NOVRAM. As shown in FIG. 4, an array recall signal is applied to the RAM 34. This signal is propagated thereto from expander 47 (the coupling between them not being shown).

If there had been an antecedent power failure, the non-volatile memory locations would contain a footprint. As indicated by the diamond-shaped block 102 in the flow chart of FIG. 5A, the microprocessor, immediately after restoring the NOVRAM, checks whether there has been an antecedent power failure. It does so by a normal data read operation involving an interrogation of the appropriate locations of RAM 34. If a footprint is found, the microprocessor branches, as indicated in FIG. 5A, to a routine to find a restart point from the footprint data. Next, the microprocessor initializes its I/O ports and then generates a vector to point to a restart address so as to proceed with the execution of the program stored in the ROM 32.

If the results of the power fail check show that there had not been an antecedent power failure, the microprocessor proceeds as indicated in the flow chart of FIG. 5A, to initialize its I/O ports, and then enters a loop 103 directed to ensuring that the closure is in its closed position.

The test condition in this loop involves determining whether the closure is in its closed position, and this test is effected by using the microprocessor port and expander 46 to interrogate the condition of switch 65. If the closure is in an open position, switch 65 will be open, and the microprocessor will accordingly generate an output signal to cause the sounding of an alarm. In addition, the microprocessor will produce an output signal at one of its ports to cause the solenoids for the deadbolts 15 to go to their unlocking positions. Next, the microprocessor will generate output signals to propagate signals via the LED interface 42 to the LEDs 25 to indicate that the closure is unlocked and to prompt closing of the door. Following that, the microprocessor loops back to determine whether the closure is closed. The microprocessor will cycle within that loop until such time as the closure is manually closed, resulting in switch 65 closing and detection of such switch closing by the microprocessor.

Upon determining that the closure is in its closed position the microprocessor begins execution of another loop 104. Within this loop the microprocessor produces signals to control the LEDs 25 so that one of them indicates that the safe is locked and to ensure that the LED for prompting closing of the door is off. Following that, the microprocessor effects a determination whether the correct number of cassettes are in place within the storage region. As part of this determination, the microprocessor reads in data from the RAM 34 concerning the number of cassettes that should be in place, and uses its ports to interrogate the slot sensors 50 to determine the number of cassettes that are actually in place. If these two items of data do not match, the microprocessor proceeds to loop back to check whether the door is closed. If the correct number of cassettes are in place, the microprocessor proceeds to cause the locking means to lock the door and to cause the alarm interface to turn off the alarm.

Following the execution of the last control steps, the microprocessor again checks to determine whether the closure is in its closed position, as indicated by block 105. This rechecking of the closure condition is not redundant. It will be appreciated that a finite amount of time is required for the solenoids within the locking means to operate. It would be undesirable to have the apparatus be prone to tampering by a person opening the closure door during the short period of time involved in moving the deadbolts into their locking position. Accordingly, the microprocessor checks to determine whether the closure is in its closed position, this check being effected within a loop 106 in which the microprocessor also checks whether a card (i.e., record member) is inserted, and exits the loop only if the closure is in its closed position and a card is not inserted. After exiting that loop, the microprocessor updates the indicating means so that an LED no longer prompts an attendant to remove a card. Next, the microprocessor updates the indicating means to prompt the attendant to insert a card, as indicated by block 107. The sequence of operation that follows block 107 is depicted in FIG. 5B.

Figure 5B:
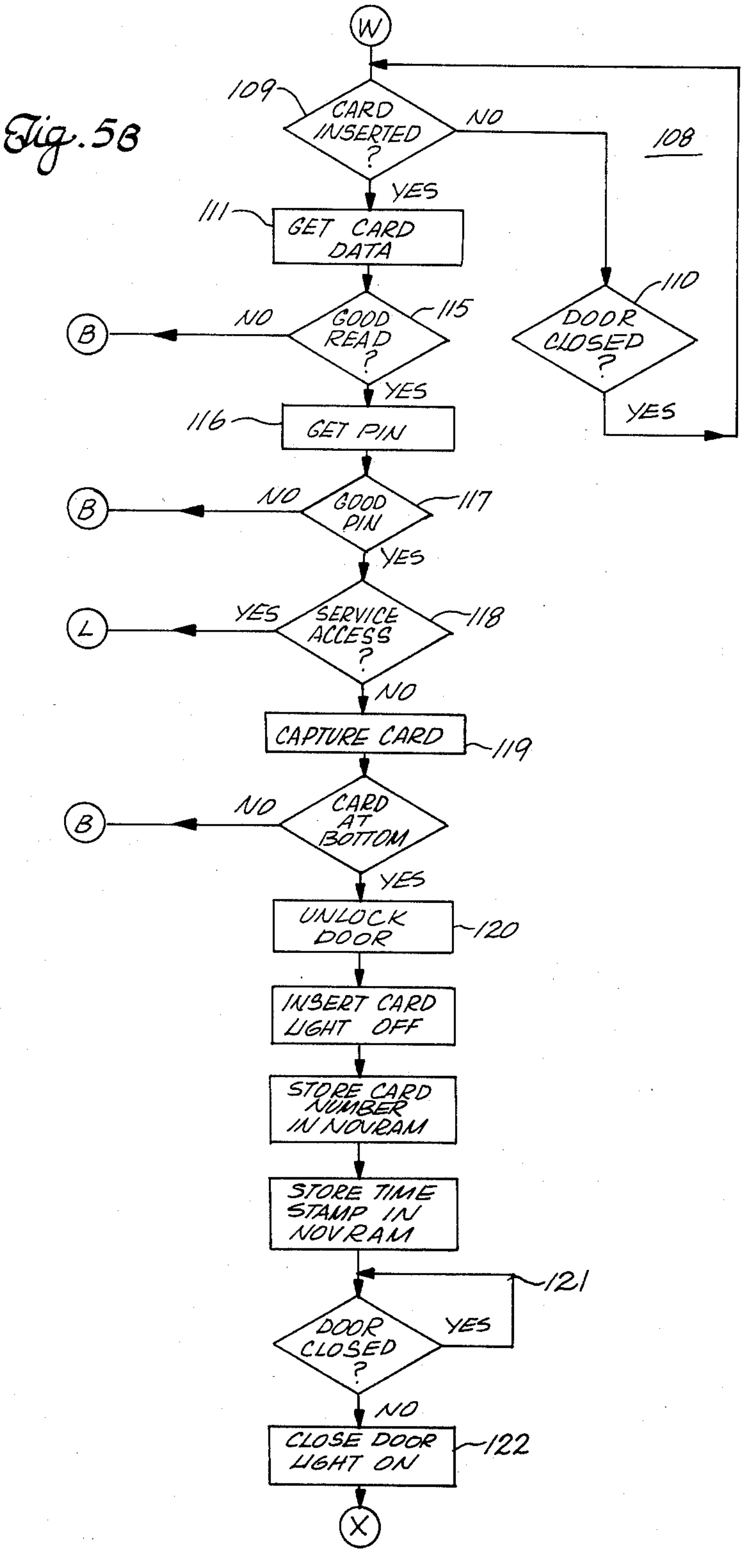

With reference to FIG. 5B, the microprocessor enters a loop 108 to determine whether a card has been inserted. The microprocessor responds to the signals applied to its T1 and T2 terminals by the reader interface 60 during the card-inserted check indicated by block 109. When those signals report that a card is not inserted, the microprocessor branches to check the closure condition data again. In the flow chart, letters which are encircled, such as the letter "A" shown adjacent the block 110 in FIG. 5B, indicate jumping points. For example, following a determination that the closure is open (block 110), the microprocessor jumps to the point in the flow chart of FIG. 5A where the letter "A" appears.

Upon detecting that a card is inserted, the microprocessor reads in the prerecorded data from the card (block 111). It does so by executing a port command to read in the data provided by the reader interface 60. Next, in block 115, the microprocessor determines whether the data just read in is consistent with the format of the data prerecorded on a valid card. If not, the microprocessor branches as indicated by the letter "B" to the similarly indicated point in the flow chart of FIG. 5A.

Upon detecting that the card data read in is consistent with the required format, the microprocessor then reads inputted data from the keyboard (block 116). Next, the microprocessor checks whether the manually inputted data (key data) is the right "key" (block 117). Any of numerous well known "hashing" techniques are suitable for carrying out this function. An advantage of using such a hashing technique is that an inspection of the holes punched in the card will not reveal the relationship that needs to exist between the prerecorded data and the key data to unlock the safe.

Upon detecting that the card data correlates with the key data, the microprocessor determines whether a service or use access is involved (block 118). Suitably, service personnel are assigned specially coded cards and correspondingly coded PINs to identify themselves in the course of revoking a service rod of operation. If a service access is involved, the microprocessor branches to carry out the sequence of operations depicted in the flow chart of FIG. 5E. Otherwise, it continues with the operations depicted in FIG. 5B, including the step of capturing the card (block 119). It is at this point that the microprocessor executes a port command to cause the capturing means to capture the card by energizing the solenoid that drives the rod 78 (FIG. 3) through the inserted card.

Next, the microprocessor executes a port command to determine whether the card is "at bottom," i.e., in place, and if so, the microprocessor executes a port command to cause the blocking means to unlock the closure by causing the deadbolts 15 to move to the unlocked position (block 120). Then, the microprocessor updates the indicating means so that it discontinues prompting an attendant to insert a card. Next, the microprocessor executes a series of write operations to store data into the RAM 34. This data includes the processor data that is read from the inserted card, and time stamp data obtained from the real-time clock. The record so stored serves as an "audit trail" which is useful in isolating individuals who have had access to the storage region within the safe.

Next, the microprocessor enters a loop 121 in which it remains so long as the closure remains in its closed position. Upon determining that the closure is in an open position, the microprocessor causes the indicating means to prompt the attendant to close the closure (block 122). The sequence of operation that follows block 122 is depicted in the flow chart of FIG. 5C.

Figure 5C:
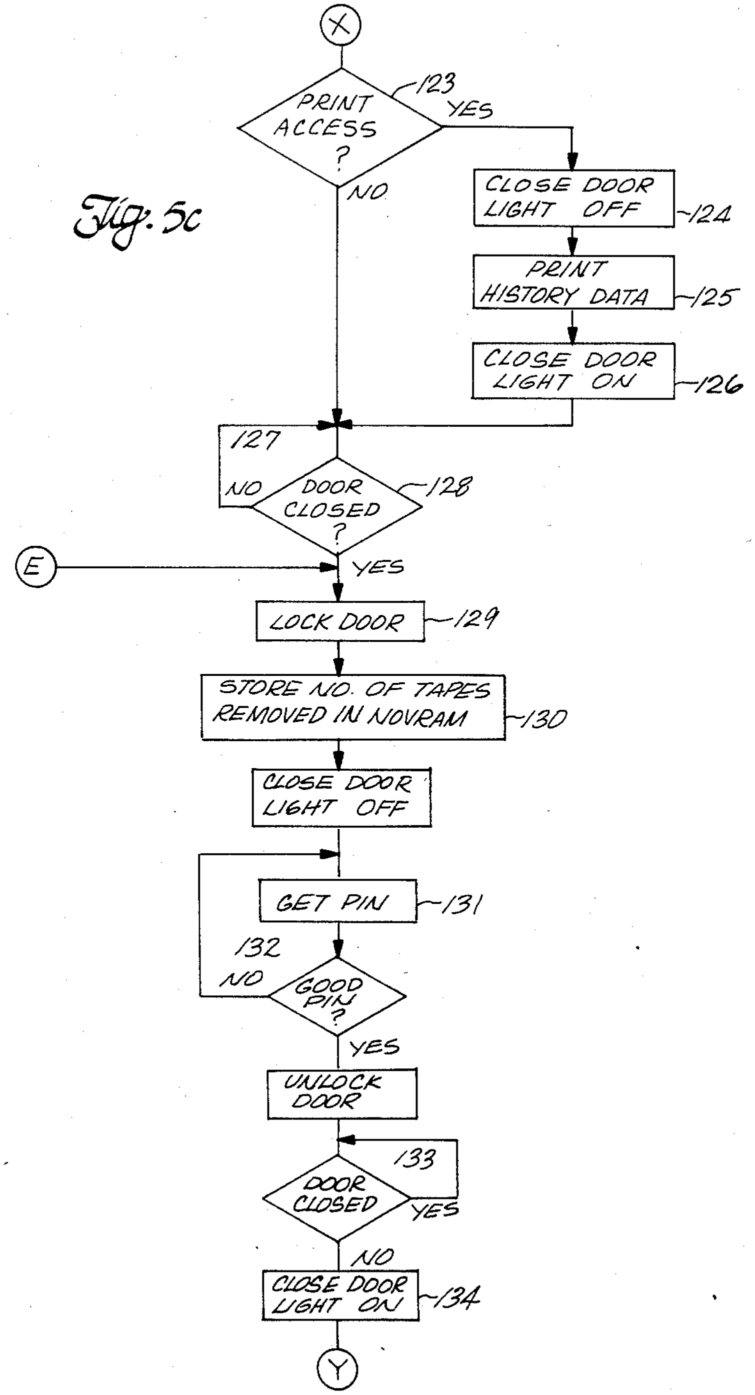

As shown in FIG. 5C, the microprocessor checks to determine whether a print access is involved (block 123). If so, the microprocessor branches to perform the steps described in blocks 124, 125, and 126. Next, the microprocessor enters a loop 127, which involves a test described in block 128, i.e., whether the closure is closed. The loop 127 is entered either immediately after execution of block 123 or after execution of the block 126.

The microprocessor exits loop 127 upon detecting that the closure is in its closed position, and proceeds to cause the locking means to lock the closure (block 129). Then, the microprocessor stores a number into the RAM 34 to report how many cassettes were removed (block 130). The microprocessor determines this number by using its I/O port to read in the closure condition data defined by the slot sensors. Next, the microprocessor updates the indicating means so that it no longer prompts the attendant to close the closure.

From what has so far been described, it will be appreciated that the microprocessor forms part of an electronic data processing means for controlling predetermined sequences of operation during various modes of operation including an item-removal mode, and which is operative during the item-removal mode for detecting a predetermined relationship between first and second codes, to cause the capturing of a record member used to supply the first code.

Having so captured the card used to gain custodial access to one or more video cassettes within the storage region, the apparatus retains that card until a further sequence of operations occurs during an item-replacement mode of operation. These operations commence at block 131, which is part of a loop 132 that is repeatedly executed until the microprocessor indicates that the same PIN is manually entered again as had been entered to cause the apparatus to permit access to the storage region.

Upon such detection, the microprocessor causes the locking means to unlock the closure, and then executes the loop 133 until the closure is opened. Upon exiting loop 133, the microprocessor updates the indicating means to prompt the attendant to close the closure (block 134). The next sequence of operation is depicted in FIG. 5D.

Figure 5D:
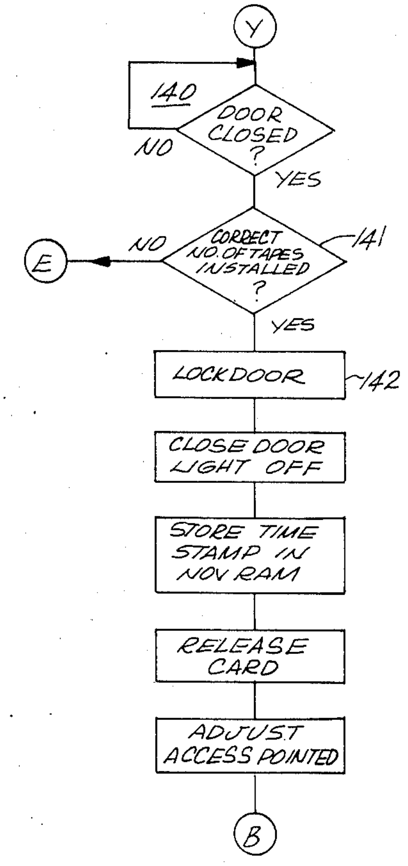

As indicated in FIG. 5D, the microprocessor executes a loop 140 repeatedly until it determines that the closure is in the closed position. Then, in block 141, the microprocessor branches to the point in FIG. 5C indicated by the letter "E."

Upon determining that the correct number of cassettes are in place, the microprocessor causes the locking means to lock the closure (block 142) and causes the indicating means to discontinue prompting the attendant to close the closure. Next, in block 143, the microprocessor causes time-stamp data to be stored in RAM 34 as part of the record concerning the item-replacement operation. Next, the microprocessor causes the capturing means to release the card (block 144), and adjusts the access pointer, and then jumps to point B in the flow chart of FIG. 5A. It will be appreciated that the sequence of operations involved from loop 132 in FIG. 5C to and including the operation of releasing the card in FIG. 5D involve an item-replacement mode of operation.

Figure 5E:
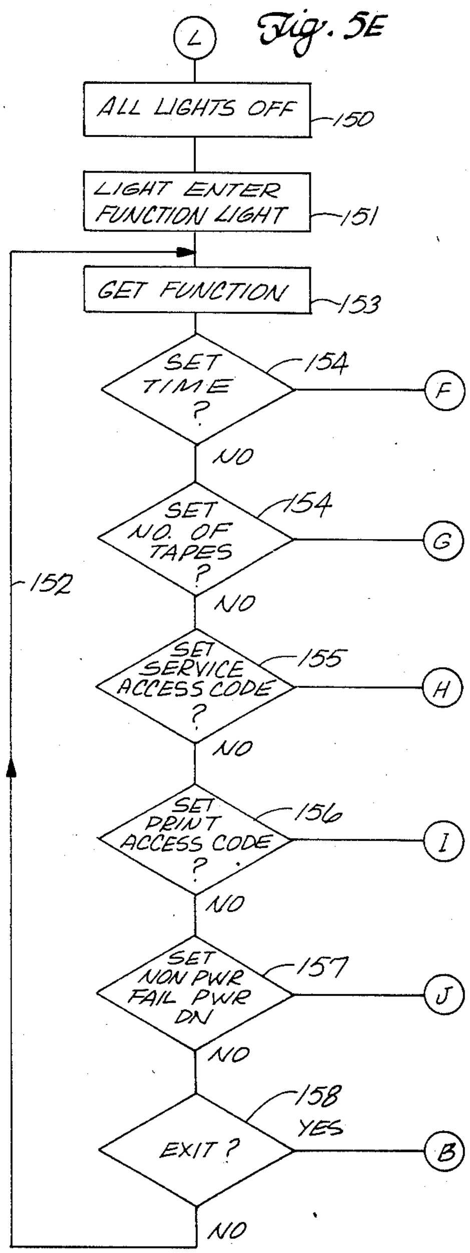

With reference to FIG. 5E, there will now be described the sequence of operations carried out during a service access. This sequence is entered following block 118 (FIG. 5B). In block 149, the microprocessor clears the indicating means by turning all the LEDs off. In block 150 the microprocessor causes the indicating means to prompt the service attendant to enter a function code identifying a desired service function by pressing selected keys on the keyboard.

Next, the microprocessor enters a loop 151 which entails a conventional sequential comparison search to determine where to branch next. Within loop 151 the microprocessor reads the keyboard input (block 152). If the entered function code identifies a set time function, the microprocessor branches from block 153 to the point indicated at "F" in FIG. 5I. If the entered function code identifies a set number of cassettes function, the microprocessor branches from block 154 to the point indicated at "G" in FIG. 5J. If the entered function code identifies a set service access code function, the microprocessor branches from block 155 to the point indicated at "H" in FIG. 5K. If the entered function code identifies a set print access code, the microprocessor branches from block 156 to the point indicated at "I" in FIG. 5G. If the entered function code identifies a set non-power fail power down function, the microprocessor branches from block 157 to the point indicated at "J" in FIG. 5H. If the entered function code identifies an exit function, the microprocessor branches from block 158 to the point indicated at "B" in FIG. 5A. If none of the foregoing functions is identified by the most recently entered function code, the microprocessor loops back to get another function code. In short, the microprocessor cycles in loop 151 until such time as the service attendant keys in a valid function code.

Figure 5F:
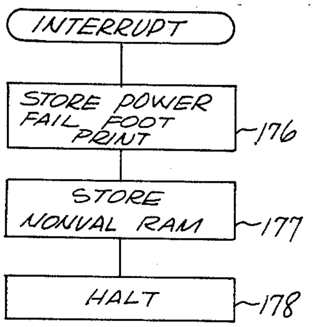
Figure 5G:
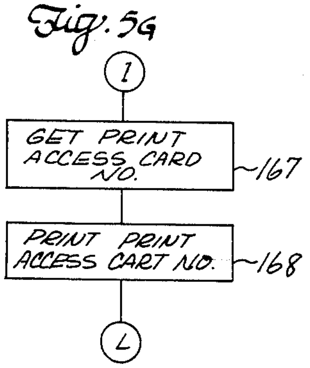
Figure 5H:
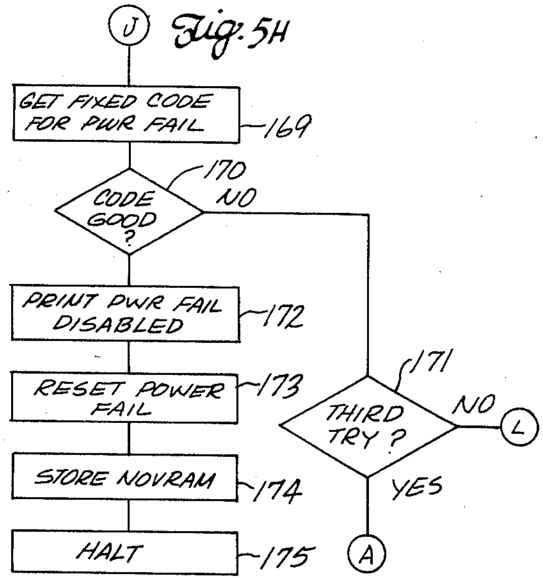
Figure 5I:
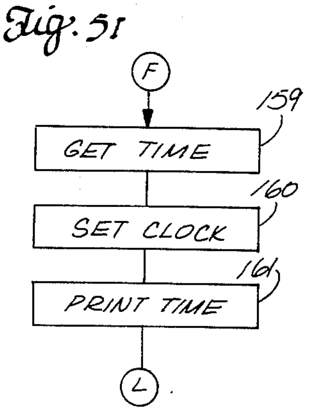

With reference to FIG. 5I, the microprocessor performs the functions set out in blocks 159, 160, and 161 to perform the set time function. To this end, in block 159 the microprocessor reads in from the keyboard manually inputted data defining the current time, then executes a port command to cause the clock interface 71 to update the clock 69 to the desired time, and finally the microprocessor in block 161 causes the printer to print out the time so set. Next, the microprocessor branches from block 161 to the point indicated at "L" at the top of FIG. 5E.

Figure 5J:
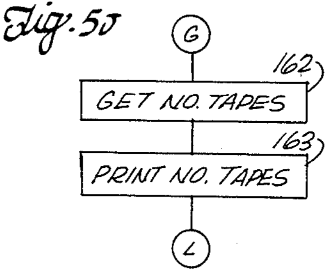

With reference to FIG. 5J, the microprocessor executes the functions described in blocks 162 and 163 so as to perform the function of setting the number of cassettes. To this end, the microprocessor in block 162 reads in manually inputted data from the keyboard identifying the number of cassettes which are to be stored in the safe, and then causes in block 163 the printer to print out that number. Then, the microprocessor loops back to the point indicated at "L" in FIG. 5E.

Figure 5K:
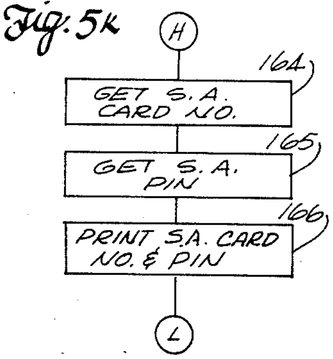

With reference to FIG. 5K, the microprocessor executes the functions described in blocks 164, 165, and 166 to perform the function of setting the service access code. To this end, the microprocessor in block 164 reads in manually inputted data from the keyboard identifying a service access card number. Then, in block 165 the microprocessor reads in from the keyboard a manually inputted service access PIN. Next, in block 166 the microprocessor causes the printer to print out the service access card number and PIN and then loops back to the point indicated at "L" in FIG. 5E.

With reference to FIG. 5G, the microprocessor executes the functions described in blocks 167 and 168 to perform the function of setting the print access code. To this end, the microprocessor in block 167 reads in manually inputted data from the keyboard which identifies the print access card number, and then in block 168 the microprocessor causes the printer to print the print access code number. Then, the microprocessor loops back to the point indicated in "L" in FIG. 5E.

With reference to FIG. 5H, the microprocessor performs the functions described therein to set the non-power fail power down. To this end, the microprocessor in block 169 reads in manually inputted data from the keyboard that identifies a fixed code; and, in block 170 the microprocessor checks whether the inputted code is valid. If not, the microprocessor branches to block 171 to check whether three consecutive attempts have been made to enter a valid code without success. This is done in the conventional manner of incrementing a register to store a count reflecting the number of consecutive unsuccessful attempts made to enter a valid access code. If fewer than three consecutive unsuccessful attempts have been made, the microprocessor loops back from block 171 to the point indicated at "L" in FIG. 5E. If three consecutive unsuccessful attempts have been made, the microprocessor branches from block 171 to the point indicated at "A" in FIG. 5A. This, of course, means that the microprocessor will then cause an alarm to be set off.

With reference again to block 170, if the microprocessor determines that a valid code has been entered, the microprocessor proceeds to block 172 to print an indication that the power fail has been disabled. Then, in block 173 the microprocessor resets the power fail, in block 174, the microprocessor causes data to be stored in the RAM 34. Then, in block 175 the microprocessor comes to a halt.

With reference to FIG. 5F, the functions described in blocks 176, 177, and 178 are performed in the event of an interrupt (i.e., when the power fail signal is produced by the power fail circuit 87). In block 176 the microprocessor causes the footprint to be stored in non-volatile memory locations to RAM 34. This footprint is saved so that the microprocessor will be able to determine where to restart when power is again available. Next, in block 177 the microprocessor causes non-volatile memory locations in RAM 34 to preserve a copy of the contents of the volatile memory locations. This is effected by executing a port command to apply an array store signal to the RAM 34. Following block 177 the microprocessor halts.

What is claimed is:

1. Apparatus for selectively permitting custodial access to valuable items, which comprises:

a safe having a closure movable between closed and open positions, and having a valuable-item storage region from which and into which valuable items can be removed and replaced while the closure is in its open position;

locking means operable while the closure is in its closed position for selectively locking and unlocking the closure;

access-control means including prerecorded data entry means for deriving a first code from a record member, the prerecorded data entry means including a receptacle configured to guide the record member as it is inserted and withdrawn from the receptacle and reading means for deriving the first code upon insertion of the record member into the receptacle, manually controlled means for inputting a second code, and data processing means for controlling predetermined sequences of operation during item-removal and item-replacement modes of operation;

capturing means selectively operable to capture and release an inserted record member;

transducing means for supplying data to the data processing means for use in controlling said predetermined sequences of operation; and the data processing means including means operative during the item-removal mode of operation for detecting a predetermined relationship between such first and second codes, to cause the capturing means to capture the inserted record member and to cause the locking means to unlock the closure, and further including means operative during the item-replacement mode of operation to respond to data supplied by the transducing means to cause the capturing means to release the inserted record member.

2. Apparatus according to claim 1, wherein the transducing means further includes means for supplying closure-condition data to report whether the closure is in its open position or its closed position, and wherein the data processing means includes means responsive to the closure-condition data to cause the locking means to lock the closure.

3. Apparatus according to claim 2, wherein the data processing means includes means responsive to the closure-condition data for sequencing the operation of the locking means and the capturing means during the item-replacement mode of operation to cause the locking means to lock the closure before the capturing means releases the record member.

4. Apparatus according to claim 3, wherein the transducing means includes at least one sensor within the storage region for supplying part of the data used by the data processing means to cause the capturing means to release the inserted record member.

5. Apparatus according to claim 3, wherein the safe includes means defining a plurality of compartments within the storage region, and the transducing means includes sensing means for supplying compartment-condition data to report which of the compartments contains a valuable item, said compartment-condition data being supplied to the data processing means as part of the data used in controlling said predetermined sequences of operation.

6. Apparatus according to claim 5, wherein the sensing means includes a plurality of sensors within the storage region, each for supplying part of the data used by the data processing means to cause the capturing means to release the inserted record member.

7. Apparatus according to claim 2, and further comprising indicating means for prompting manual control steps, and wherein the data processing means includes means responsive to the closure-condition data for causing the indicating means to prompt the manual step of closing the closure.

8. Apparatus according to claim 1, wherein the data processing means includes memory means and means for storing data into a memory means to provide a record for each of a series of item-removal and item-replacement operations.

9. Apparatus according to claim 8 wherein the memory means comprises integrated-circuit memory means having a plurality of non-volatile memory locations.

10. Apparatus according to claim 1, wherein the closure is a hinged door.

11. Apparatus according to claim 1, wherein the safe is manually movable, and adapted to be releasably secured in place by mounting means positioned within the storage region so as to be accessible only while the closure is in its open position.

* * * * *